United States Patent [19]

Miyake

[11] 4,046,426
[45] Sept. 6, 1977

[54] ANTISKID DEVICE

[75] Inventor: Katsuya Miyake, Ageo, Japan

[73] Assignee: Akebono Brake Industry Co., Ltd., Nihonbashi, Japan

[21] Appl. No.: 655,598

[22] Filed: Feb. 5, 1976

[51] Int. Cl.² .............................................. B60T 8/02
[52] U.S. Cl. ...................................... 303/100; 303/92; 303/115
[58] Field of Search .............. 303/92, 100, 109, 115, 303/DIG. 2; 73/509; 180/82 R; 188/181 R; 307/10 R; 340/53, 62

[56] References Cited

U.S. PATENT DOCUMENTS

| | | | |
|---|---|---|---|
| 3,632,177 | 1/1972 | Packer | 303/100 |
| 3,725,858 | 4/1973 | Arai et al. | 303/109 X |
| 3,827,761 | 8/1974 | Inada | 303/92 |
| 3,905,652 | 9/1975 | Sugiyama et al. | 303/92 X |

Primary Examiner—Stephen G. Kunin
Attorney, Agent, or Firm—Sughrue, Rothwell, Mion, Zinn and Macpeak

[57] ABSTRACT

An antiskid device is provided having an electromagnetic valve which operates when actuated to control a modulator for modulating the braking pressure applied to the wheel cylinders. The valve is actuated only when a signal, indicating a skid condition, occurs simultaneously with the brake pressure in the wheel cylinders being above a predetermined minimum.

3 Claims, 7 Drawing Figures

1

ANTISKID DEVICE

BACKGROUND OF THE INVENTION

The invention relates to antiskid devices for automobiles or the like.

In a conventional antiskid device a sensor, adapted to detect the speed of rotation of the wheels, provides a speed signal to a logic circuit incorporated therein for detecting the skidding of the wheels. An electromagnetic valve of a modulator mounted in the antiskid device is actuated by a braking pressure reducing signal from the logic circuit so that the braking force can be reduced. In those instances where the friction between the wheels and the road surface is low and the engine brake continues to be applied, it is difficult for the wheels to regain their original speeds even though the braking force is reduced. As a result the braking pressure reducing signal is sometimes continuously sent by the logic circuit thereby actuating the electromagnetic valve for a long period of time. When this happens and the braking pressure reducing signal finally goes off, the braking pressure can not be increased immediately due to a time lag in the modulator, and therefore, the brake stopping distance of the vehicle increases substantially.

SUMMARY OF THE INVENTION

In accordance with the present invention, an antiskid device is provided which overcomes the above-mentioned disadvantage. The problem is overcome by preventing the electromagnetic valve from being actuated by the braking pressure reducing signal alone. Instead the occurrence of the latter condition is ANDed with a minimum pressure condition in the wheel cylinders to actuate the electromagnetic valve. Additionally a detector circuit is incorporated in the device for detecting failures in the modulator or the brake system.

DETAILED DESCRIPTION OF THE INVENTION

Figure 1:
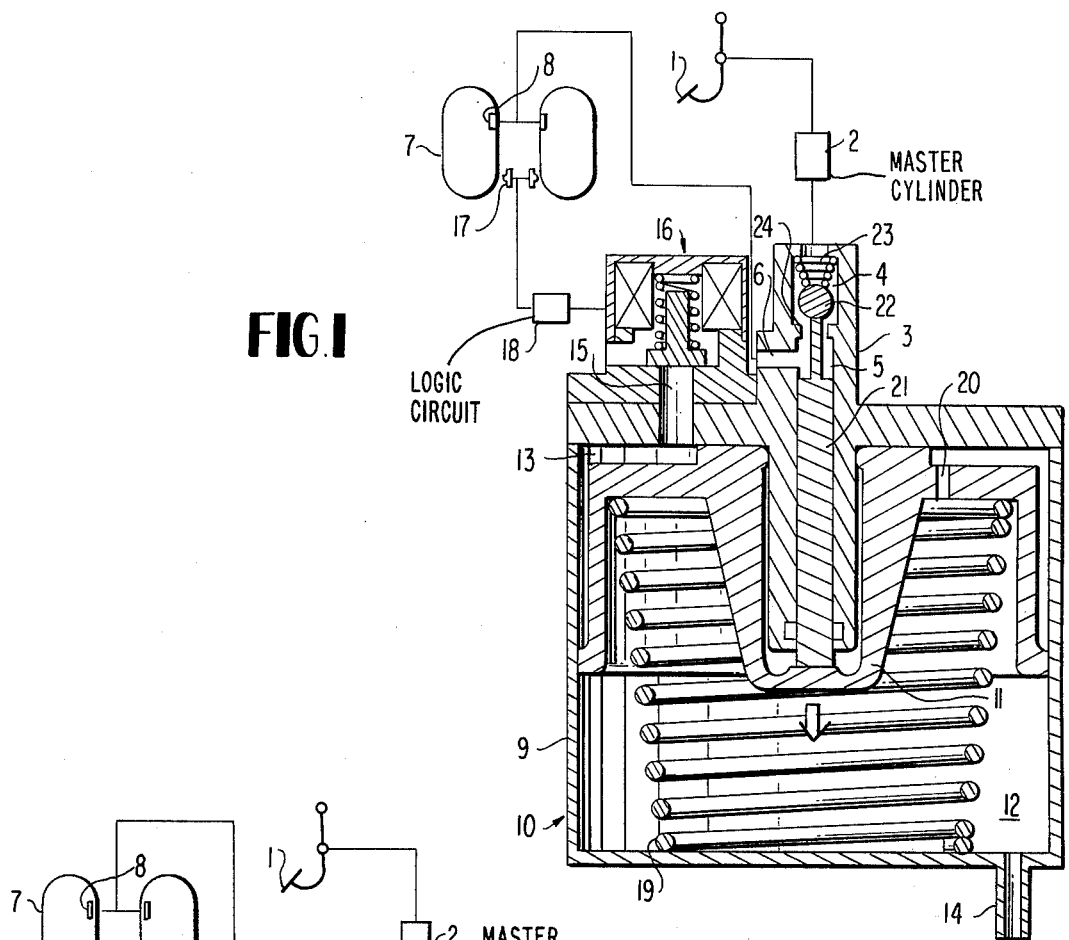
FIG. 1 is a longitudinal sectional view of a conventional antiskid device when it is in an inoperative condition.

Referring to FIG. 1, when a brake pedal 1 is depressed, a fluid pressure is produced in a master cylinder 2. The fluid pressure thus produced is exerted, through a valve chamber 4, a pressure reducing chamber 5 and a passage 6, formed in cylinder body 3 within a modulator 10, on wheel cylinders 8 of wheels 7. The modulator 10 consisting of the cylinder body 3 and a shell 9 fixedly secured to the outer periphery of the cylinder body 3 is internally divided by a power piston 11, mounted to move freely in the axial direction along the inner surface of the shell, into a low pressure chamber 12 and a high pressure chamber 13. The low pressure chamber 12 is connected through a conduit 14 to the intake manifold of an engine so as to be subjected to a negative pressure, and the high pressure chamber 13 is connected through a gas stream passage 15 to an electromagnetic valve 16.

Sensors 17 positioned to detect the speed of rotation of wheels 7 is connected to a logic circuit 18 which provides a braking pressure reducing signal output when skidding occurs. The latter output signal energizes electromagnetic valve 16 to unblock passage 15 and to permit air to flow into the high pressure chamber 13. The power piston 11 is biased when the device is in the inoperative condition towards the high pressure chamber 13 by a return spring 19 mounted within the low pressure chamber 12. Further, the power piston is formed with an orifice 20 which connects the low pressure chamber 12 and the high pressure chamber 13 so that the high pressure chamber 13 is also normally subjected to a negative pressure. A plunger 21, disposed within the cylinder body 3 so as to move freely in the axial direction, and one end in contact with the power piston 11 and the other end, which forms a reduced diameter portion, adapted to abut against a ball 22 disposed in the valve chamber 4. The ball 22 is urged against the plunger 21 by a spring 23 mounted between the inner walls of the valve chamber 4 and the ball, and is kept away from valve seat 24.

The elements of the antiskid device thus arranged occupy the relative positions as shown in FIG. 1 when the device is in the inoperative condition. When the brakes are actuated, the fluid pressure is produced in the master cylinder 2 is exerted on the wheel cylinders 8. When the logic circuit 18 detects skidding of the wheels 7, the electromagnetic valve 16 is opened by the braking pressure reducing signal. Air flows into the high pressure chamber thereby producing a pressure differential between the high and low pressure chambers 12 and 13. The differential pressure forces the power piston 11 in the direction indicated by the arrow in FIG. 1, and the plunger 21, no longer restrained by the power piston 11, is moved by the fluid pressure build up within the wheel cylinders 8. When the ball 22 is brought into contact with the valve seat 24, the communication between the master cylinder 2 and the wheel cylinders 8 is cut off The plunger 21 continues a further downward movement away from the ball 22 so that the internal volume of the pressure reducing chamber 5 will increase, thereby reducing the braking pressure. When the braking pressure is reduced sufficiently to permit the wheels 7 to regain their original speed of rotation, the braking pressure reducing signal goes off and the electromagnetic valve 16 is closed. As a result, the pressure differential between the chambers 12 and 13 is gradually decreased to zero by orifice 20 so that the biasing force of the return spring 19 moves to power piston 11 back into the position shown in FIG. 1 thereby increasing the braking pressure gradually. The above-mentioned operation is repeatedly effected during the application of brakes under normal operating condition.

Figure 2:
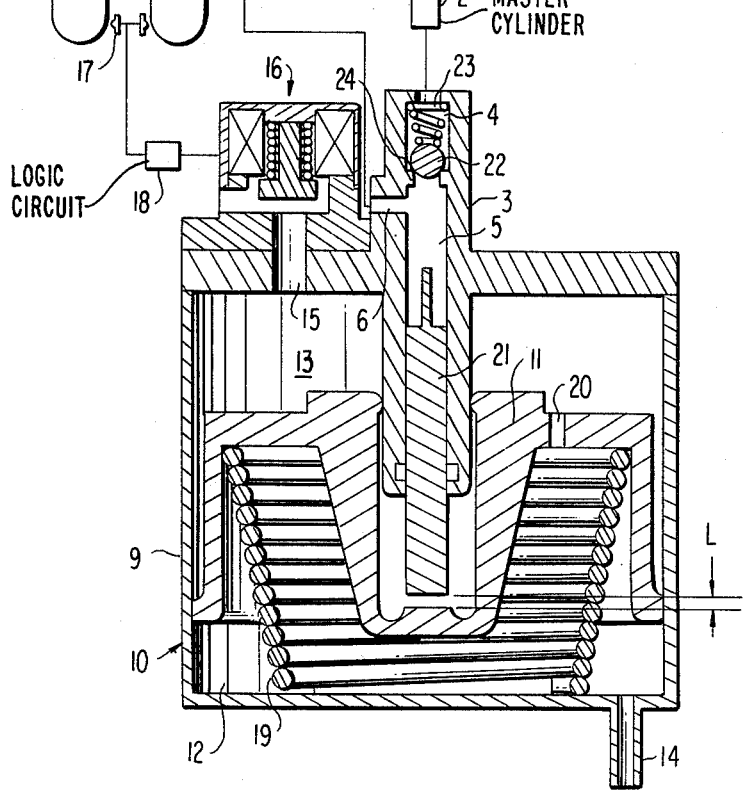
FIG. 2 is a longitudinal sectional view of the same antiskid device when an electromagnetic valve actuating signal is transmitted for an abnormally long period of time.

FIG. 2 illustrates the conventional antiskid device under the condition which occurs when a braking pressure reducing signal is transmitted for an abnormally long period of time. When the logic circuit 18 detects skidding of wheels 7, it transmits a braking pressure reducing signal to the electromagnetic valve 16 so that the latter is rendered operative to reduce the braking pressure as previously described. If the friction between the wheels and the road surface is low it will be difficult for the wheels to regain their original speed of rotation even after the braking pressure has been reduced to zero. Therefore, the braking pressure reducing signal will be transmitted by the logic circuit 18 to the electromagnetic valve 16 for a long period of time so that the latter continues its operation and the power piston 11 is moved continuously against the biasing force of the spring 19. In this case, because of the braking pressure being reduced to zero, the plunger 21 cannot move, and a gap L is formed between the power piston 11 and the plunger 21 as shown in FIG. 2. For this reason, even after the braking pressure reducing signal goes off, it takes a time lag T, before the power piston 11 abuts the plunger 21 and moves the latter toward the ball 22.

Figure 3:
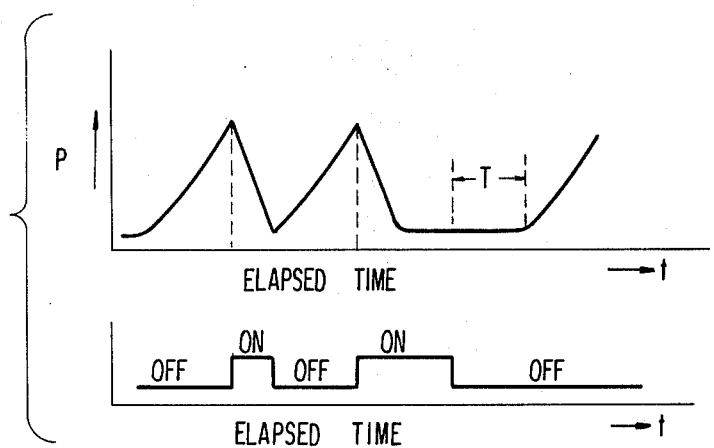
FIG. 3 shows the relationship between the braking pressure and the electromagnetic valve actuating signal in the conventional antiskid device.

FIG. 3 shows a relationship between the braking pressure P and the braking pressure reducing signal or the electromagnetic valve actuating signal, and in this drawing the abscissa represents elapsed time. When the braking pressure reducing signal goes on, shown by the first "ON" signal in FIG. 3, the braking pressure drops rapidly. When the signal goes off, the braking pressure begins to rise immediately. When the braking reducing signal goes off after being on for an abnormally long period of time, as shown by the second ON and "OFF" signals in FIG. 3, the braking pressure does not begin to increase, until after a time lag. T.

Figure 4:
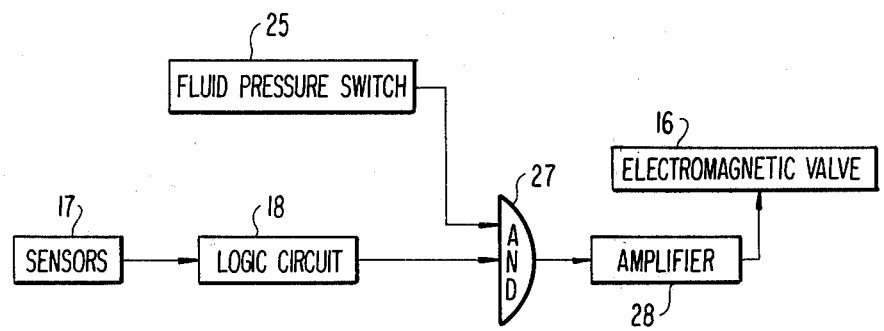
FIG. 4 shows a system interconnection of a first embodiment incorporating a control circuit according to the present invention.

FIG. 4 shows an interconnection system for controlling the antiskid device in accordance with the present invention. As shown, the braking pressure reducing signal from the logic circuit does not operate as the sole control signal for the electromagnetic valve. Instead the latter signal is combined with the outputs of a wheel cylinder fluid pressure switch 25 in an AND gate 27 for actuating the valve 16. The AND gate output is amplified by an amplifier 28. The wheel cylinder fluid pressure switch 25 is attached to the wheel cylinder 8 and provides an output signal when the fluid pressure acting upon the wheel cylinders exceeds a predetermined value. The predetermined value at or below which the wheel cylinder cannot provide an effective braking force, is set nearly equal to zero. Elements for carrying out the function of block 25 are well known in the art. Additionally it should be understood that the so-called signal output from the switch may consist of a change in voltage or current, or may consist of the closing or opening of a switch.

The arrangement is made such that the electromagnetic valve 16 is actuated by the output signal transmitted by the AND circuit when the following conditions exist coincidently: the braking pressure within the wheel cylinders 8 exceeds the above-mentioned predetermined value; and the wheels are skidding on a road surface. The actuation of electromagnetic valve 16 reduces the braking pressure rapidly. As the braking pressure is reduced below the predetermined value, the fluid pressure switch is deenergized thereby causing the electromagnetic valve 16 to close.

Figure 5:
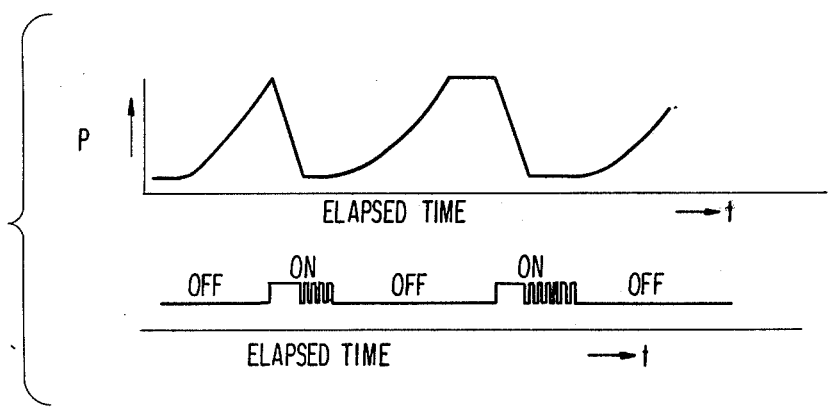
FIG. 5 shows a relationship between the braking pressure and the electromagnetic valve actuating signal in the antiskid device according to the present invention.

Subsequently, with the closure of the electromagnetic valve 16, the power piston 11 and the plunger 21 commence to return to their positions as indicated in FIG. 1 thus increasing the braking pressure above the predetermined value. Consequently, the wheel cylinder fluid pressure switch 25 is rendered operative which results in completing the AND circuit and opening the electromagnetic valve 16 again. The foregoing operations are repeatedly made until the wheels 7 regain their original speed and the braking pressure reducing signal from the logic circuit 18 goes off. The power piston 11 will always be kept in contact with the plunger 21 and the braking pressure within the wheel cylinders 8 can be maintained at a value sufficient for actuating the fluid pressure switch 25 as indicated in FIG. 5. The latter figure shows a relationship between the braking pressure P and the electromagnetic valve actuating signal. It will be appreciated that the time lag T inherent to the conventional antiskid device can be completely eliminated. Accordingly, as soon as the braking pressure reducing signal from the logic circuit 18 goes off, the braking pressure acting on the wheel cylinders 8 can be increased.

Figure 6:
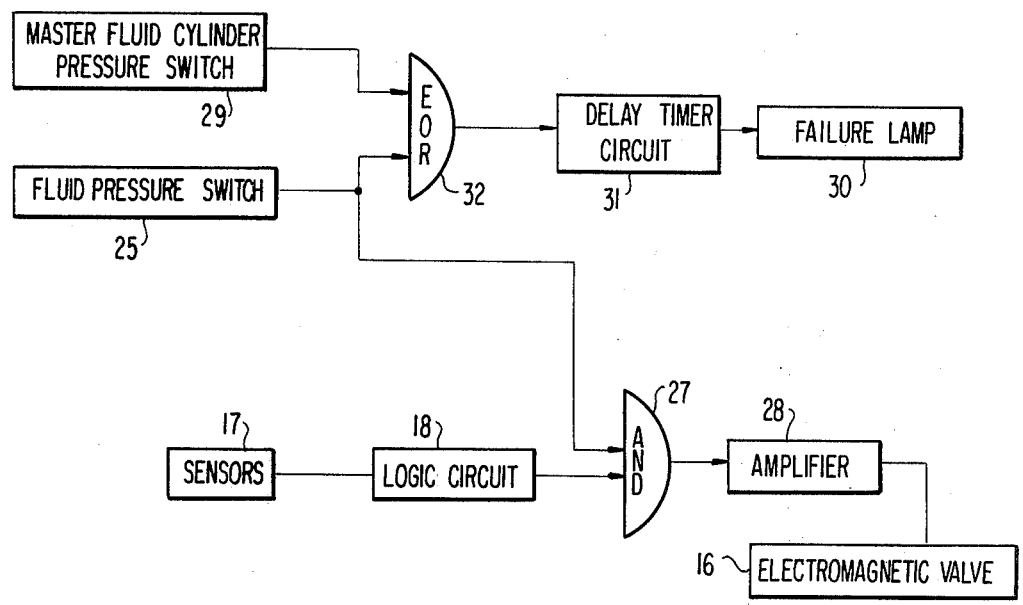
FIG. 6 shows a system interconnection of a second embodiment incorporating a control circuit according to the present invention.

FIG. 6 shows a second embodiment of the control circuit according to the present invention. This embodiment comprises, in combination with the control circuit of the first embodiment, a circuit including a brake sensing means for providing a signal indicating that the brake is being applied. As an example the brake sensing means could comprise a master cylinder fluid pressure switch 29, connected in parallel with said switch 25, to detect the fluid pressure in the master cylinder 2. The embodiment also includes an exclusive OR circuit 32 adapted to actuate a delay timer circuit 31 which controls a failure indicating lamp for detecting trouble in the antiskid device or the brake system when it receives only one of the output signals from the switches 25 and 29.

In the second embodiment of the present invention, the operation for actuating the electromagnetic valve 16 is entirely the same as that for the first embodiment, and is therefore omitted from the following explanation. Further, according to the second embodiment, when the brakes are applied and wheels are skidding on the road, the electromagnetic valve 16 is actuated to reduce the braking pressure, and the fluid pressure in the wheel cylinder 8 is reduced below a predetermined value, the wheel cylinder fluid pressure switch is deenergized to complete the exclusive OR circuit 32 so that the delay timer circuit 31 may be actuated. Thereafter, when the electromagnetic valve 16 is closed and the braking pressure applied on the wheel cylinders 8 is increased to a level sufficient to render the wheel cylinder fluid pressure switch 25 operative, the exclusive OR circuit can not be completed so that operation of the delay timer circuit 31 is cut off. However, when the braking pressure can not be increased at all due to a failure in the modulator 10, the delay timer circuit 31 continues to operate, and after the lapse of a predetermined time, the failure indicating lamp 30 is turned on by the output signal transmitted by the delay timer circuit 31 thereby detecting the failure. Furthermore, if the hydraulic fluid circuit extending from the modulator 10 to the wheel cylinders 8 is damaged due to any reason, the fluid pressure in the wheel cyliners 8 will be prevented from increasing as well, thereby resulting in the failure indicating lamp 30 being turned on.

Figure 7:
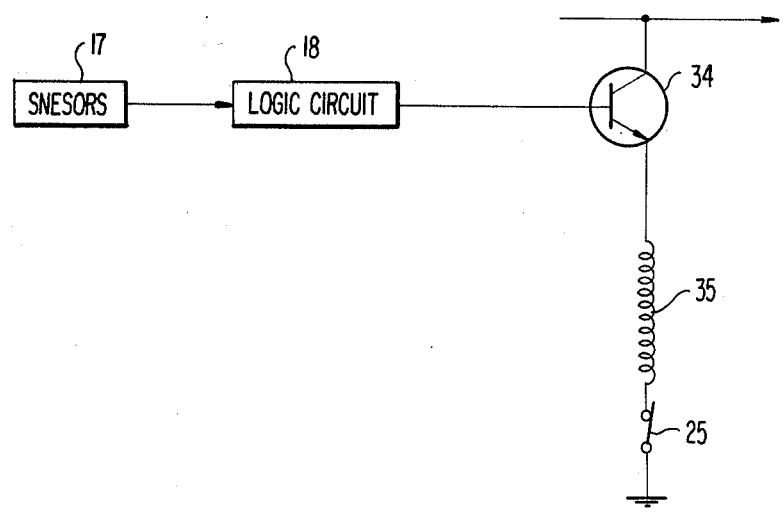
FIG. 7 shows a system interconnection of a third embodiment of the present invention.

FIG. 7 illustrates a third embodiment of the present invention wherein the output signals produced by the logic circuit 18 are transmitted to the base terminal of a transistor 34. The transistor 34 has a collector terminal connected with a power supply, and an emitter terminal connected through an exciter coil 35 of the electromagnetic valve 16 and the fluid pressure switch 25 of the wheel cylinder to ground. The operation of this embodiment is substantially same as that of the first embodiment. When the braking pressure applied on the wheel cylinders 8 is reduced below a predetermined value, during the time that the braking pressure reducing signal is transmitted, the switch 25 is opened, and the electromagnetic valve 16 of the modulator 10 is closed so that movement of the power piston 11 away from the plunger 21 can be prevented. Further, the switch 25 may be located between the power supply and the collector terminal of the transistor 34 or between the output terminal of the logic circuit and the base terminal of the transistor 34.

As can be clearly seen from the foregoing, the antiskid device incorporating the control circuit of the present invention is advantageous in that when the braking pressure reducing signal is transmitted by the logic circuit to the electromagnetic valve for a long period of time, the reduction of the braking pressure to a predetermined value will result in the electromagnetic valve being rendered operative and inoperative alternately. Therefore the movement of the power piston away from the plunger can be prevented so that the braking pressure can be increased immediately after the wheels regain their original speed. As a result, the brake stopping distance of the vehicle will not increase due to the time lag inherent to the conventional antiskid device, and safe operation can be ensured when applying an emergency brake. Further, a failure or failures in the brake system can be readily detected by provision of a failure detector circuit.

It is to be understood that the above description is by way of example only, and that details for carrying the present invention into effect may be varied without departing from the scope of the invention claimed.

What is claimed is:

1. In an antiskid device for preventing wheels from skidding, said device being of the type having, sensor and logic means for developing a braking pressure reducing signal when said wheels are in a skid condition, a braking system having a master cylinder and wheel cylinders for applying braking pressure to said wheel cylinders, a modulator for reducing the braking pressure to said wheel cylinders when actuated, the improvement comprising, pressure sensor means responsive to the braking pressure at said wheel cylinders for providing a braking pressure minimum signal when the braking pressure in said wheel cylinders is above a predetermined minimum which is set nearly at zero where the braking pressure will be ineffective, and circuit means responsive to said braking pressure reducing signal and said braking pressure minimum signal for actuating said modulator only when both said signals are in coincidence, said pressure sensor means comprising a pressure switch actuated when said minimum pressure is exceeded, and said circuit means comprising a transistor having base, collector, and emitter electrodes, said base being connected to receive said braking pressure reducing signal, and said collector and emitter forming an output circuit in combination with a control coil for said modulator, said pressure switch being electrically connected in said circuit to prevent actuation of said circuit when said switch is open, wherein said switch is in series with said coil.

2. In an antiskid device for preventing wheels from skidding, said device being of the type having, sensor and logic means for developing braking pressure reducing signal when said wheels are in a skid condition, a braking system having a master cylinder and wheel cylinders for applying braking pressure to said wheel cylinders, a modulator for reducing the braking pressure to said wheel cylinders when actuated, the improvement comprising, pressure sensor means responsive to the braking pressure at said wheel cylinders for providing a braking pressure minimum signal when the braking pressure in said wheel cyliners is above a predetermined minimum which is set nearly at zero where the braking pressure will be ineffective, and circuit means responsive to said braking pressure reducing signal and said braking pressure minimum signal for actuating said modulator only when both said signals are in coincidence, a brake sensing means for providing a braking signal when a brake is applied, and circuit means responsive to the exclusive occurrence for a predetermined delay time of only one of said braking pressure minimum signal and said braking signal for providing a failure indication.

3. In an antiskid device as claimed in claim 2, wherein said last mentioned circuit means comprises, an Exclusive-OR logic circuit, a delay timer for providing an output if actuated for a delay time, and an indicator, said Exclusive-OR logic circuit having two inputs connected respectively to said pressure sensing means and said brake sensing means, and one output connected to actuate said delay timer, the output of said delay timer being connected to said indicator.

* * * * *